No. 855,501. PATENTED JUNE 4, 1907.
C. E. CARPENTER.
CLUTCH DEVICE FOR AUTOMOBILES.
APPLICATION FILED JAN. 5, 1906.
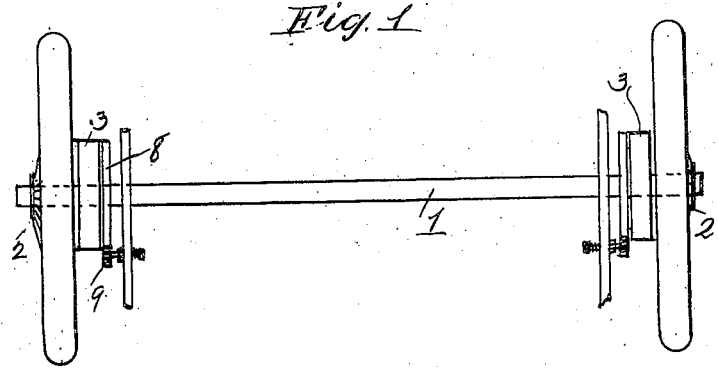
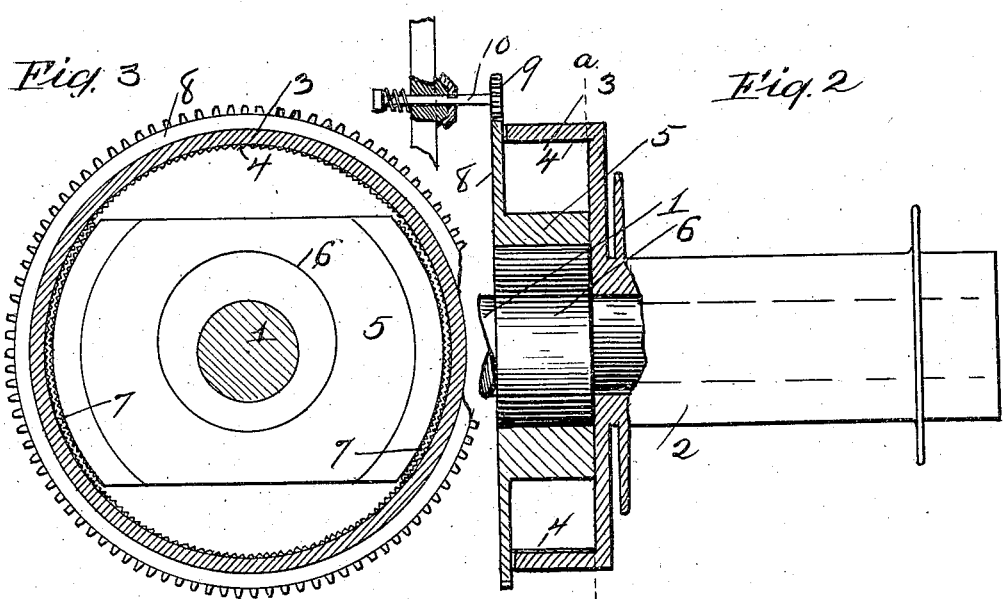
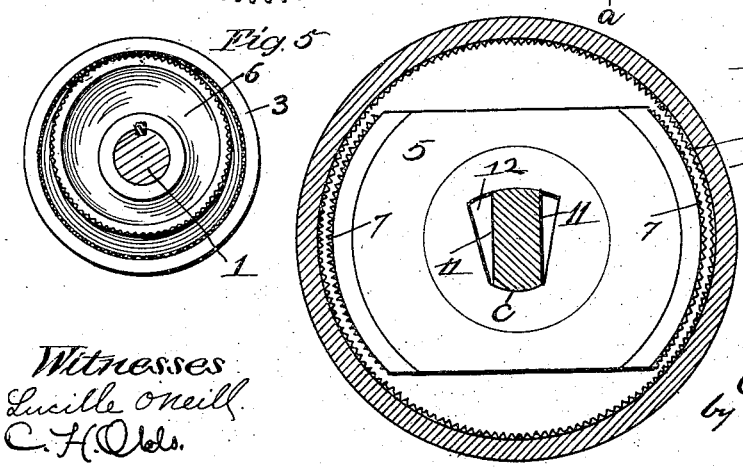
Witnesses
Lucille O'Neill
C. H. Olds
Inventor
Charles E. Carpenter
by Wm. M. Monroe
Attorney

UNITED STATES PATENT OFFICE.

CHARLES E. CARPENTER, OF CLEVELAND, OHIO.

CLUTCH DEVICE FOR AUTOMOBILES.

No. 855,501.　　　　Specification of Letters Patent.　　　　Patented June 4, 1907.

Application filed January 5, 1906. Serial No. 294,712.

*To all whom it may concern:*

Be it known that I, CHARLES E. CARPENTER, a citizen of the United States, and a resident of Cleveland, county of Cuyahoga, State of Ohio, have invented certain new and useful Improvements in Clutch Devices for Automobiles, of which I hereby declare the following to be a full, clear, and exact description, such as will enable others skilled in the art to which it appertains to make and use the same.

The objects of the invention are to provide a clutch for a wheel or driven part, which rotates with a revolving shaft such as a counter shaft or vehicle axle, and to so construct and arrange the engaging parts as to cause the automatic release of the driven part whenever it is impelled to travel faster than the rate of revolution of the shaft or axle. This device is appropriately used with motor vehicles in which the driving axle is provided with two wheels and where one wheel is often impelled to move faster than the other wheel and where if the wheels are both rigid upon the axle one must drag unless temporarily released.

In the application of the device to the driving mechanism or running gear of a vehicle the same construction applies whether the driven parts are upon the axle or upon the motor counter shaft such as is employed upon some automobiles, to reduce the motor speed to an appropriate traveling speed.

Further objects are to overcome the objectionable tendency of a motor driven vehicle to swerve from the path upon rough ground or when going around a curve owing to unequal resistance upon the driving wheels, which may cause one to slacken its speed and impart an irregular or undulating movement to the vehicles. This irregularity in speed imparted to the wheels also renders steering difficult and is one of the causes of a dangerous strain upon the driving shaft or axle.

The device differs from differential gear machines in that in those machines the inner wheel is loosed when turning a curve and the driving power is all thrown upon the outer wheel, which has the disadvantage of being less easily controlled, and of turning too far, or it is possible that the inner wheel may be reversed in movement thus causing a sudden swerve or skidding of the machine.

A further object is to eliminate the differential gear and so to employ a solid driving axle.

A further object is to provide an automatic device for this purpose which can be used with instantaneously acting motors such as electric motors when the clutch must operate instantaneously and not permit the motor to gain momentum before engaging with its load.

The invention is shown in the drawings as applied to the hub of a wheel or sprocket, and an axle upon which two wheels are secured and consists in the disk shaped clutch upon the wheel hub and provided with an annular rim, and in an eccentrically moving agency within the rim and upon the axle, which is normally forced by the axle when rotating to interlock with the rim and cause the wheel to move in unison with the axle, but if the wheel should rotate faster than the axle, the rim will disengage itself from said eccentrically moving agency and remain free until the speed is reduced to that of the axle when the engagement between the parts is restored. This agency is shown as a transverse bar.

The invention also has reference to a friction device which will operate to steady and prevent irregular movement and contact of the bar when released, and before the movements of the wheel and axle coincide.

The invention also consists in the combination of details, as hereinafter described, shown in the accompanying drawings and specifically pointed out in the claims.

In the drawings, Figure 1 is a plan view of an automobile axle having two wheels, to the hubs of one of these are applied the automatic clutches and releasing devices; Fig. 2 is an enlarged longitudinal section of clutch rim and eccentrically moving clutch bar showing an operating cam therefor upon the axle, and a friction roll mounted upon some fixed portion of the frame of the machine which is designed to press upon and prevent the irregular movement of the bar when released; Fig. 3 shows a transverse section of the same on line a—a Fig. 2; Fig. 4 is a similar view of a modified form where the cam upon the axle or the axle is faced away or flattened on two sides and moves in a wedge shaped slot in the transverse bar. The action of this form of cam is eccentric but the reverse of the one shown in Fig. 3. Fig. 5 shows a simple form of cam upon the shaft and annular rim upon the wheel.

In these views, 1 is the axle, 2 the wheel hub provided with the projecting annular rim 3. The inner surface of this rim is toothed or milled at 4.

5 is the transverse bar upon the axle in an opening in the center of which is shown the cam 6 secured to the axle. The bar is of slightly less diameter than the milled inner face of the rim and its edges are correspondingly milled at 7 so as to lock firmly with the rim when thrown out against it.

In operation, as soon as the axle begins to revolve the cam thereon will throw out the bar until one milled edge thereof will engage the milled inner face of the rim, when the wheel will move in unison with axle; when however the wheel (as on the outer curve) begins to be impelled to rotate faster than the axle, the rim will immediately move away from and disengage itself from the milled edge of the bar and will not come into contact again therewith until the curve is passed and the wheel resumes the same speed as the shaft and its other wheel. To prevent irregular motion of the bar or locking agency and the possibility of its being again engaged by the rim before the speeds are equal, a friction device to steady its movement is required. Here a circular plate 8 is shown exterior to the rim and secured to the bar and revolving with it. The edge of this plate is toothed and a pinion 9 engaging therewith is mounted upon a spring pressed shaft 10, which prevents it from rotating freely and hence retards the movement of the bar so that its own inertia may not cause it to swing into contact with the rim. The friction device is an important means to the completion of the device but other means may be employed for this purpose without departing from the spirit of the invention.

In Fig. 4 the cam action is the reverse of the one shown in Fig. 3, but the result is the same. The sides of the axle 1 are flattened at 11 to obtain the cam or eccentric movement and a web shaped opening 12 is made in the bar 5, bounded by circular arcs on two sides, the axle fitting the smaller curve c. This part of the axle always engages the smaller end of the wedge and throws it over until the wheel revolves faster than the axle, when the axle will stand in the center of the opening 12.

It will be seen that with this device a complete annular clutch rim is essential since it can not be demonstrated what portion thereof will be engaged by the eccentric locking device.

The shape of the radially moving bar 5 is unimportant to the invention and the cam 6 can be enlarged to take its place, as shown in Fig. 5. The device obviously applies to analogous uses.

The desired action is seen to exert its influence radially in such a manner as to engage and disengage the clutch rim alternately, as the shaft changes its direction of rotation, any increase in the speed of rotation of the wheel & clutch rim causing the disengagement with the locking means. The eccentric action exemplifies this movement but is not necessarily the only movement which will accomplish this result— The spirit of the invention includes broadly this radial clutching action in connection with the withdrawal of the engaging means from contact when the rim speeds up to move faster than the shaft.

Having described the invention what I claim as new and desire to secure by Letters Patent is:

1. In a clutch organized to engage a shaft and wheel only when the parts are rotating with equal speed, the combination with the shaft and a cam thereon, of a rotatable part loosely mounted upon the shaft, a rim thereon having an annular toothed inner edge and a radially moving part in which said cam is designed to operate, said radially moving part having toothed edges, organized to alternately engage with the annular toothed edge of said rim, said toothed edges being each an arc of less than one half of the circle of the annular rim, substantially as described.

2. In a clutch for a vehicle having a frame & shaft & wheel and organized to engage the shaft and wheel only when the parts are rotating with equal speed, the combination with the shaft and a rotatable part loosely mounted upon the shaft and a rim thereon having an annularly toothed inner edge, of an eccentrically acting member rotatable with said shaft, said member having toothed edges, adapted to engage alternately with said toothed rim, and instrumentalities for preventing irregular movement of the interlocking parts, comprising a plate or flange upon the eccentrically moving part, a gear thereon, a pinion and pinion shaft, upon the frame, and a friction device for said pinion shaft, substantially as described.

3. In a clutch organized to engage a shaft and wheel only when the parts are rotating with equal speed, the combination with the shaft and a cam thereon comprising parallel linear sides faced in said shaft, of a rotatable part loosely mounted on said shaft, a rim thereon having an annular toothed inner edge, and a radially moving part in which said cam is designed to operate, said radially moving part having toothed edges, organized to alternately engage with the annular toothed edge of said rim, and the said radially moving part provided with a wedge shaped opening in which said faced portion of the shaft is inserted, substantially as described.

In testimony whereof I hereunto set my hand this 30th day of December 1905.

CHARLES E. CARPENTER.

Witnesses:
C. H. OLDS,
WM. M. MONROE.